(12) United States Patent
Rosen

(10) Patent No.: US 7,528,993 B2
(45) Date of Patent: May 5, 2009

(54) HIDING IMAGES IN HALFTONE PICTURES

(75) Inventor: Joseph Rosen, Omer (IL)

(73) Assignee: Concealogram Ltd., Rosh Ha'ain (IL)

( * ) Notice: Subject to any disclaimer, the term of this patent is extended or adjusted under 35 U.S.C. 154(b) by 1234 days.

(21) Appl. No.: 10/451,419

(22) PCT Filed: Nov. 21, 2001

(86) PCT No.: PCT/IB01/02194

§ 371 (c)(1),
(2), (4) Date: Mar. 22, 2004

(87) PCT Pub. No.: WO02/43000

PCT Pub. Date: May 30, 2002

(65) Prior Publication Data

US 2004/0146159 A1 Jul. 29, 2004

(51) Int. Cl.
*H04N 7/167* (2006.01)
(52) U.S. Cl. .............. 358/3.28; 358/3.06; 380/200
(58) Field of Classification Search ............. 358/1.9, 358/3.01, 3.06, 3.28; 380/200, 243, 277
See application file for complete search history.

(56) References Cited

U.S. PATENT DOCUMENTS

| | | | | |
|---|---|---|---|---|
| 4,627,819 A | * | 12/1986 | Burrows | 434/337 |
| 4,889,367 A | * | 12/1989 | Miller | 283/88 |
| 5,315,098 A | * | 5/1994 | Tow | 235/494 |
| 5,329,108 A | * | 7/1994 | Lamoure | 235/494 |
| 5,416,312 A | * | 5/1995 | Lamoure | 235/494 |
| 5,706,099 A | * | 1/1998 | Curry | 358/3.28 |
| 5,710,636 A | * | 1/1998 | Curry | 358/3.28 |
| 5,734,752 A | * | 3/1998 | Knox | 358/3.28 |
| 6,081,345 A | * | 6/2000 | Curry | 358/3.28 |
| 6,690,811 B2 | * | 2/2004 | Au et al. | 382/100 |
| 2004/0141210 A1 | * | 7/2004 | Wong | 358/3.28 |

* cited by examiner

*Primary Examiner*—Thomas D Lee
(74) *Attorney, Agent, or Firm*—Pearl Cohen Zedek Latzer, LLP

(57) ABSTRACT

A method for hiding at least one pattern within a visible representation of the other different pattern is presented. The method is carried out by an encoding device and consists of selecting a predetermined key function, and utilizing this function to cerate a binary halftone representation of the visible pattern, in which said at least one pattern is hidden. This halftone representation is such that each cell therein has halftone dots' position distribution corresponding to the gray-level distribution of the at least one hidden pattern. By processing the binary halftone representation by a two-dimensional spatial correlator based on the key function, data representative of the at least one hidden pattern can be extracted.

22 Claims, 10 Drawing Sheets

HIDING IMAGES IN HALFTONE PICTURES

FIELD OF THE INVENTION

The present invention is generally in the field of encryption/decryption techniques and relates to a method and device for hiding one pattern within the other. The invention is particularly useful for items' identification and authentication

BACKGROUND OF THE INVENTION

Various techniques of hiding one image within the other, visible image have been developed. U.S. Pat. No. 5,710,636 discloses a technique based on distributing pixels of an image to be hidden in between the pixels of a visible image, such that the hidden image can be identified by significant enlargement of the visible image. According to the techniques disclosed in U.S. Pat. Nos. 4,627,819 and 4,889,367, physical filtering means are used to separate between the hidden and visible images. This is implemented by using different recording materials to record the hidden image within the visible image, and using different kinds of incident radiation to read these images.

Another techniques of the kind specified utilize halftone coding methods. According to the technique disclosed in U.S. Pat. Nos. 5,329,108 and 5,416,312, the halftone dots (bits) of an image to be hidden are encoded and located within a predetermined area of a visible image. This predetermined area is selected as a background area of the visible image. U.S. Pat. No. 5,315,098 discloses a technique for encoding digital data in the angular orientation of circularly asymmetric halftone dot patterns that are written into the halftone cells of digital halftone images. According to this technique, each of the cells of digital data representative of a visible image is modified to encode the corresponding halftone dot of an image, which is to be hidden.

Halftone coding is a common method of representing continuous-tone images by binary values. As known [O. Bryngdahl et al., "Digital halftoning: synthesis of binary images," in *Progress In Optics*, E. Wolf, ed. North-Holland, Amsterdam, 1994, Vol. 33, pp. 389-463], according to the halftone binarization technique, various tone levels are translated to the area of binary dots. This method, known as binarization by a carrier [D. Kermisch and P. G. Roetling, "Fourier spectrum of halftone images," J. Opt Soc. Am. A 65, 716-723 (1975)], is related to the pulse-width modulation in communication theory.

SUMMARY OF THE INVENTION

There is a need in the art to facilitate hiding of one pattern within the visual representation of the other, to thereby facilitate items' identification or authentication, by providing a novel method and device for encoding visual is information (pattern) in a halftone picture.

The main idea of the present invention is associated with the following. The gray level pixels of a visual picture are transformed into halftone dots in a halftone picture. Each gray-level pixel is transformed into a cell of white dots on a black background where their number (area occupied by these dots) represents the gray level. The dots' locations inside their cells usually do not represent any information. This non-uniformity (randomness) in the dots' positions from cell to cell is actually used to reduce the difference between the original gray-tone image and the resultant binary image as viewed by a detection system. According to the present invention, the dots' distribution within each cell of the halftone picture of a first visible pattern is encoded in accordance with the gray levels of the entire second pattern, which is to be hidden.

Thus, the present invention provides for utilizing a selected key function for creating a binary halftone representation of a first visible pattern carrying at least one second hidden pattern, which can be extracted out of the halftone picture by a specific processing (correlation). To create such halftone representation, a combination of two independent modulations is used. One such modulation is based on the principles of pulse-width modulation and consists of modulating the dots' area in the picture, a so-called dot-area modulation (DAM). The other modulation utilizes the principles of pulse-position modulation and consists of modulating the dots' position within their cells, a so-called dot-position modulation (DPM). In communication theory, the pulse-position modulation is known as an information representing method similar to the pulse-width modulation. More specifically, the halftone picture is created by binarization of a complex gray-tone function representative of the first pattern in the following manner: embedding the phase function of the complex function in the halftone picture by DPM, while encoding the magnitude of the complex function by DAM.

It should be understood that a halftone picture is typically a 2-D matrix of cells, each being characterized by a corresponding gray-tone level. Each such cell is, in turn, a 2-D matrix of halftone dots, whose number is representative of the respective gray-tone level. The present invention allows for modifying the halftone dots' distribution within their cells (i.e., the relative position of the dots' area within the cell) in the halftone picture of the first visible pattern, such that each cell carries information about the gray-tone levels of the at least one entire second pattern (hidden).

According to the invention, the binary halftone representation of the first visible pattern is such that, in each cell thereof, the magnitude of the binary function is representative of the corresponding gray-tone level of the first pattern and the halftone dots' position is representative of the gray-level distribution in the at least one second pattern. Hence, such a halftone picture representation of the first pattern should be found that, when being correlated with a predetermined reference function, yields the hidden output image. This reference function is related to the key function by spatial transformation. The visible first pattern is used as the constraint on the input function (halftone picture). This means that, instead of a meaningless pattern of binary dots in the input, the halftone picture presents the first pattern. To achieve this, a matching condition between the first and second patterns is defined, which corresponds to the best transformation (correlation) between the first and second patterns, and an optimized function of the variable transformation characteristic (phase function) is determined. This variable transformation characteristic is the characteristic of the first pattern, namely, a phase function of the complex function of the first pattern. In other words, when the first pattern is described by a complex function based on said optimized transformation characteristic, the matching condition is satisfied. This means that the correlation between the first pattern and the reference function results in the second pattern.

It is important to note that the above two modulations DAM and DPM are independent from each other, which allows using these techniques for is encoding different images in the same halftone picture. However, the DPM-encoded image cannot be viewed directly by simply observing the halftone picture, but is rather hidden in the halftone picture, requiring a specific means to reveal this hidden image. To hide a single pattern within the binary halftone representation of another visible patter, the dots within each cell are shifted along one axis only. If two different patterns are to be hidden within the binary halftone representation of the visible pattern, the dots are shifted along two mutually perpendicular axes.

The above property enables to use the technique of the present invention in information security and encryption applications. Generally, the technique of the present invention provides for creating a pictured dot code. This code, on the one hand, is a collection of dots used as a secret code, which can be deciphered only by a special key, and, on the other hand, unlike other known codes (e.g., bar code), is a picture in the sense that the code itself is a meaningful image encoded by DAM independently of the hidden image encoded by DPM.

The present invention can also be used for embedding steganographic information in halftone pictures. The ordinary visible image is conventionally encoded by DAM, whereas the steganographic image is encoded by DPM. This can be utilized in identification cards. In this case, a special halftone photograph of a person on an identification card can show the card owner's picture as usual, while the same photograph includes confidential data, such as an image of the person's signature, his/her fingerprint, or some other personal records. The card holder must thus be matched to both types of image and to all the rest of the data on the card. Hence, counterfeiting of identification cards by a person who resembles the authentic person, or switching of the photographs on their identification cards, without being discovered becomes much more difficult. The steganographic images are revealed by a special key in particular processors.

There is thus provided according to one broad aspect of the present invention, a method as implemented on an encoding device for hiding within a visible representation of a first pattern, at least one second pattern, the method comprising the steps of:

(i) selecting a predetermined key function;
(ii) utilizing said key function to create a binary halftone representation of the first pattern in which the first pattern is visible and the at least one second pattern is hidden, each cell in said binary halftone representation having halftone dots' position distribution corresponding to gray-level distribution of the at least one second pattern, thereby enabling processing of said binary halftone representation by a two-dimensional spatial correlator based on the key function to extract data representative of the at least one second hidden pattern.

According to another broad aspect of the invention, there is provided an encoding device comprising an interface utility for entering input data, and a data processing and analyzing utility, which is responsive to the input data including first and second complex functions representative of first and second patterns, respectively, and a key function, to create a binary halftone representation of the first pattern, in which the first pattern is visible and the second pattern is hidden, and in which each cell has halftone dots' position distribution corresponding to gray-level distribution of the second pattern.

According to yet another aspect of the invention, there is provided a decoding device for use in extracting a hidden pattern contained in a binary halftone representation of another visible pattern created by the above-described method. The decoding device comprises a two-dimensional spatial correlator for processing input data representative of the binary halftone representation with a spatial filter in the form of said key function, such that the hidden image is obtained in an output plane of the correlator as a correlation function between the binary halftone representation displayed in an input plane of said correlator and a predetermined reference function related to said key function by a spatial transformation.

The 2-D correlator may be implemented digitally (software) or as optical assembly.

The present invention, according to yet another aspects thereof, provides an item carrying the above-described binary halftone representation; and an item identification system utilizing the above-described decoding device.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1A:
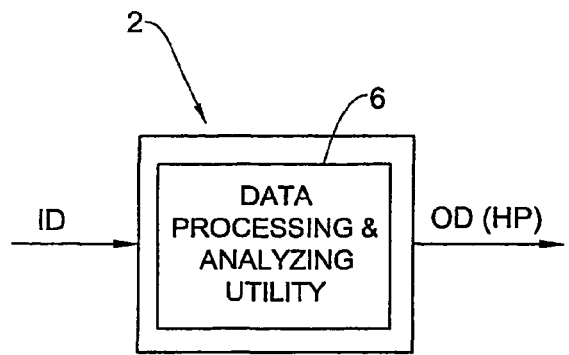
FIGS. 1A and 1B illustrate the main components of encryption and decryption units, respectively, for use in a system of the present invention.
Figure 1B:
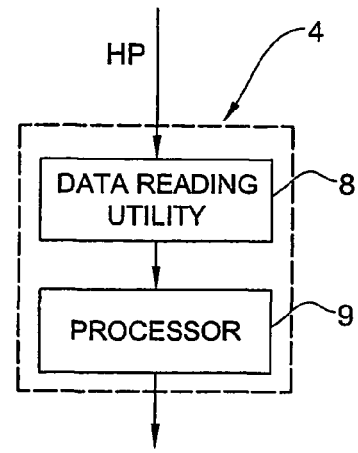
Figures 2A, 2B, 2C, 2D, 2E:
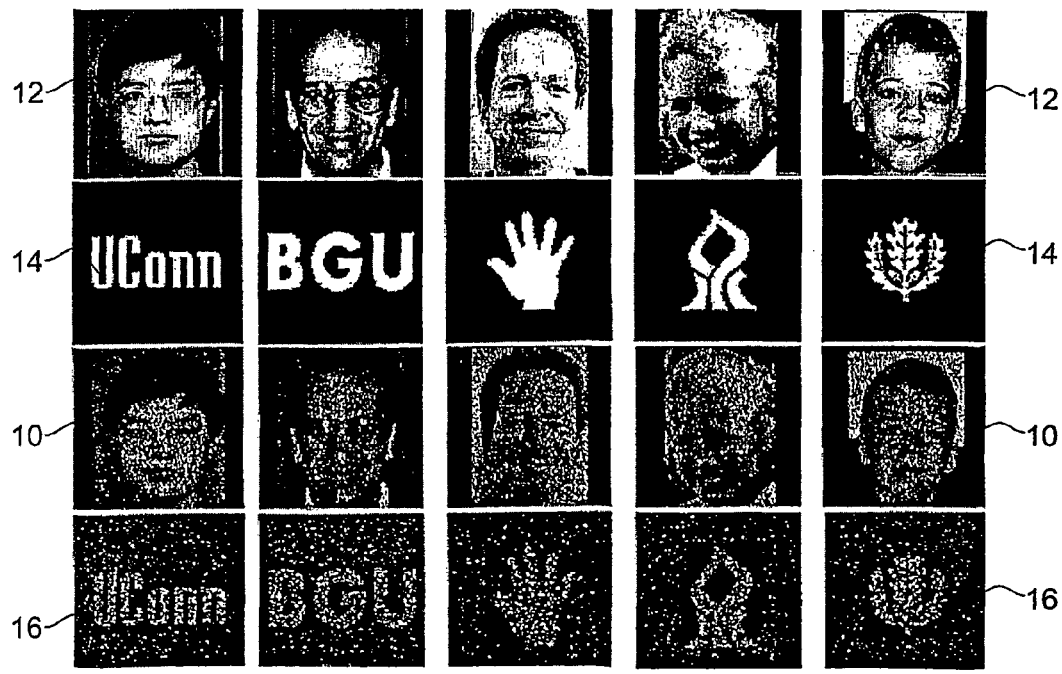
FIGS. 2A to 2E show five different examples, respectively, of a technique according to the invention for hiding one pattern (image) within the other.

FIGS. 1A and 1B illustrate, respectively, an encryption unit 2 and a decryption unit 4, for use in a system according to the invention. The only common data utilized in these units is a predetermined key function KF. The key function is a randomly selected function generated by a computer to become an unchangeable part of a digital correlator used for encryption, and a similar correlator (not necessarily fully digital) used for decryption purposes, as will be described below.

The encryption unit 2 is typically a computer device comprising an interface utility (not shown) for entering input data and preprogrammed with a predetermined data processing and analyzing utility 6 (software), which is capable of carrying out a method of the present invention. This software receives input data ID indicative of two functions representing first and second patterns, respectively, and of the key function; and processes the input data to obtain output data OD in the form of an encoded halftone picture BP of the first pattern, in which the first pattern is visible and the second pattern is hidden.

The decryption unit 4 is composed of a data-reading utility 8 (e.g., an optical scanner) and a processor 9. The data-reading utility is applied to the halftone picture HP to generate output data indicative thereof, which is processed by the processor 9 to extract data representative of the hidden pattern. It should be understood that, if the optical scanner is used as the data-reading utility, a print version of the halftone picture is considered. The processor may be a digital processor (software) or an additional optical assembly (correlator), as will be described further below.

Referring to FIGS. 2A-2E, the essence of the present invention is illustrated in five different examples, respectively. The main issue of the invention is to create a halftone picture 10 (halftone representation) of a first pattern 12 (a gray-tone image), so as to include therein a second pattern 14 (e.g., binary image), such that the first and second patterns are, respectively, visible and hidden in the halftone picture 10.

In the present examples, five pairs of visible and hidden pictures 12 and 14 were used. Originally, the visible patterns 12 were gray-tone images of the size of 128×128 pixels, and the hidden patterns 14 were binary images of various sizes smaller than that of the gray-tone images. The halftone pictures 10 are obtained by both DAM and DPM techniques, such that every part of the hidden image 14 is concealed globally in all the points of the halftone picture 10. In other words, each cell of the halftone picture 10 has appropriate halftone dots' positions indicative of the gray-levels of the entire hidden pattern 14. An additional processing (decryption) of the halftone picture 10 enables obtaining an extracted hidden pattern 16. As shown in the figures, the halftone pictures 10 enable viewing of the corresponding gray-tone images 12, and the extracted hidden images 16 are recognizable as well.

It should be noted that, although binary representation of hidden images was chosen in the present examples, the technique of the present invention is not limited to this selection, and gray-tone representation of hidden images can be used as well. However, as seen in the figures, the extracted hidden images 16 are accompanied by a certain level of noise. This noise level naturally becomes more meanings and destructive for gray-tone images. It should also be noted, although not specifically illustrated, that one more pattern (in addition to pattern 14) may be hidden within the halftone representation 10 of the visible pattern 12.

The halftone coding method utilizes digital processing of the gray-tone images (digital correlator). In the present examples of FIGS. 2A-2E, the decryption technique (extraction of the hidden image from the halftone picture) also utilized a digital correlator. It should, however, be noted and will be described in details below, that other means could be used for decryption purposes.

Figure 3A:
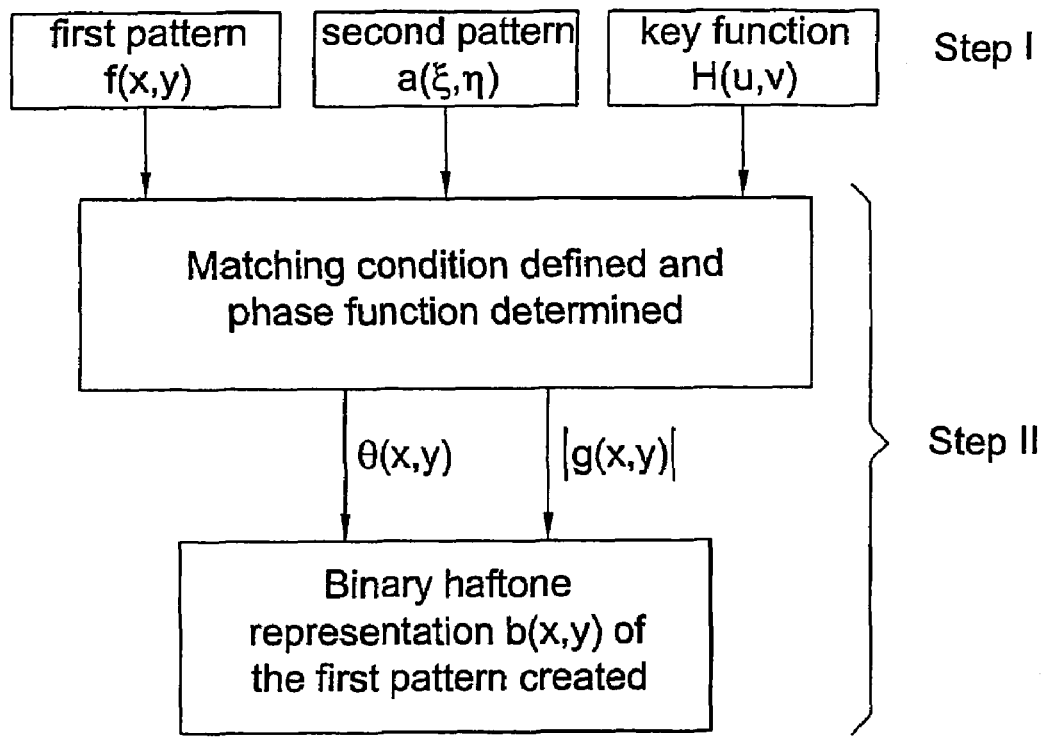
FIGS. 3A and 3B exemplify a flow chart of the a method of the present invention.
Figure 3B:
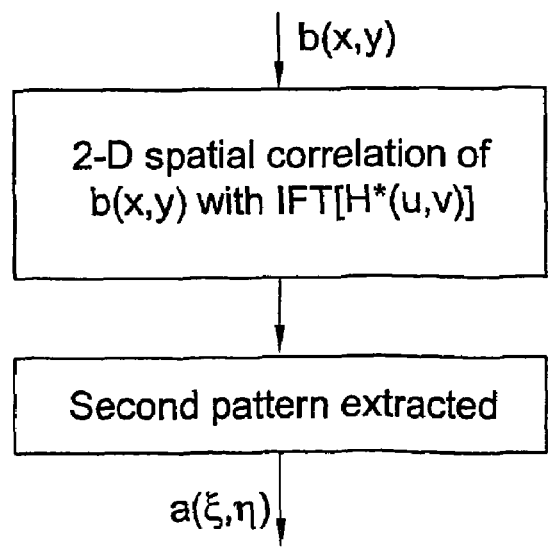

As indicated above, the creation of the halftone picture 10, namely, encoding or encryption technique, utilizes DAM and DPM applied to the first pattern 12, which is to be visible in the halftone picture 10. The main steps of the halftone picture creation method according to an example of the invention, as well as those of the hidden image extraction, will now be described with reference to FIGS. 3A and 3B.

Initially, first and second patterns (to be, respectively, visible and hidden in the halftone picture) are given by two analog (gray-level) functions $f(x,y)$ and $\alpha(\xi,\eta)$, which are independent of each other. The functions $f(x,y)$ and $\alpha(\xi,\eta)$ are defined in different coordinate systems, because they are observed in two different planes, i.e., the input and output planes of a correlator. Since the first and second functions $f(x,y)$ and $\alpha(\xi,\eta)$ represent gray-tone patterns, both functions are real and positive.

For the purposes of halftone picture creation, the first and second functions $f(x,y)$ and $\alpha(\xi,\eta)$ are described as the magnitude of the complex functions:

$$g(x,y)=f(x,y)\exp[i^\theta(x,y)]$$

$$c(\xi,\eta)=\alpha(\xi,\eta)\exp[i\psi(\xi,\eta)]$$

wherein $\exp[i^\theta(x,y)]$ and $\exp[i\psi(\xi,\eta)]$ are phase functions, each defining an additional "degree of freedom" for an image. The phase function $\exp[i^\theta(x,y)]$ presents a variable characteristic of a transformation process used in the halftone picture creation, and an optimal solution $^\theta(x,y)$ of this phase function is to be found, the purposes of which is described below.

Step I

Provided at the first step, is a key function H(u,v), which is a phase-only function (for the purposes explained below) and which is used for both halftone picture creation (encryption) and extraction of the hidden image (decryption). The key function is a random function generated by a random-number computer generator. It should be noted that the key function H(u,v) is chosen only once at the starting point of the method, and becomes an unchangeable part of the correlator. Moreover, H(u,v) is not in any way related to any of the encoded images and is not any kind of a system memory. Therefore H(u,v) does not limit the quantity of image pairs that can be revealed by the same key function.

Step II

At the second step, the key function is utilized H(u,v) to create a binary halftone representation of a first pattern, in which the first pattern is visible and a second pattern is hidden. The halftone picture is such that each cell therein has halftone dots' positions corresponding to the gray-level distribution of the second pattern. By processing such a binary halftone representation by a two-dimensional spatial correlator based on the key function, data representative of the second hidden pattern can be extracted. The halftone synthesis technique of the present invention actually presents a generalization of the Fresnel computer-generated hologram synthesis. In the hologram synthesis analogy, the key function H(u,v) acts as a generalized medium between the halftone picture and the reconstructed hidden image, in a fashion similar to that in which the quadratic phase factor represents the free-space medium in the reconstruction of a Fresnel hologram [O. Bryngdahl and F Wyrowski, "Digital holography computer-generated holograms," in Progress In Optics, E. Wolf, ed. (North-Holland, Amsterdam, 1990), Vol. 28, pp. 1-86]. The function of the medium can be that of a key to expose an image, but the medium does not contain any information about the image and therefore its size does not limit the image capacity that can be utilized by the system.

The main operational stages in the halftone picture creation step (step H) will now be described:

First Operational Stage

At the first operational stage, all three functions g(x,y), c(ξ,η) and H(u,v) are used to define a matching condition between the first and second patterns g(x,y) and c(ξ,η), and to determine the optimal solution $^\theta(x,y)$ for the phase function $\exp[i^\theta(x,y)]$. The matching condition actually presents a condition of the best transformation of one pattern into the other, such that, when the matching condition is satisfied, each cell in the halftone representation of the first pattern is indicative of the entire second pattern, as will be explained in details further below. The argument function $\theta(x,y)$ of the phase function presents a variable transformation parameter, which when being appropriately selected, provides for said matching condition.

To determine the argument function $\theta(x,y)$, the predefined transformation function is sequentially optimized by carrying out a sequence of iterations thereof until getting the optimal $\theta(x,y)$. This technique will be described more specifically below with reference to FIG. 4.

Second Operation Stage

At the second operational stage of the invented method, a binary halftone representation b(x, y) of the first pattern $f(x, y)$ is obtained, in which the halftone dots' positions within each cell are encoded in accordance with the gray-level distribution within the entire second pattern. Generally, digital data representative of the first pattern can be obtained separately by DAM and then modified by DPM to obtain the binary halftone representation b(x,y). Preferably, however, these two processes are applied concurrently to the first pattern $f(x,y)$, while creating the binary halftone picture b(x,y) thereof.

Extraction of Hidden Image

The so-obtained halftone picture b(x,y) enables revealing of the hidden pattern $\alpha(\xi, \eta)$ in the output plane of the correlator (either digital or optical) from the halftone picture b(x,y) located in the input plane of the correlator, by utilizing the key function H(u,v), namely, the complex conjugate thereof H*(u,v). This is implemented by using a 2-D spatial correlator, the key function H(u,v) being the spatial filter of this correlator, thereby enabling the hidden pattern to appear on the output plane of the correlator when the halftone picture is displayed on its input plane. In the present example, the correlator is of the kind based on a 2-D Fourier transform (FT) and inverse Fourier transform (IFT). Hence, the hidden pattern is to be obtained as the correlation function between the halftone picture and a reference function, which is related to the spatial filter function H(u,v) by a 2-D Fourier transform (FT).

It should be understood that the optimized argument function $\theta(x,y)$ of the phase function $\exp[i\theta(x,y)]$ is such that, when this phase function is multiplied by the visible pattern function $f(x,y)$ and passes through the correlator, this results in a complex function with a magnitude equal to the hidden pattern $\alpha(\xi,\eta)$. Therefore, two independent patterns $f(x,y)$ and $\alpha(\xi,\eta)$ are obtained in, respectively, the input and output planes of the correlator. Both functions are the magnitudes of the two complex functions. According to the invention, the binary halftone representation of the first visible pattern is created by binarization of the complex gray-tone function g(x,y) representative of the first pattern in the following manner: embedding the phase function $\exp[i\theta(x,y)]$ in the halftone picture by DPM, while encoding the first pattern $f(x,y)$ by DAM.

The transformation process defining the matching condition is determined by the following. The key function H(u,v) is the filter function displayed on a spatial-frequency plane. The inverse Fourier transform (IFT) of the key function, and the complex conjugate of the key function are denoted, respectively, h(x,y) and H*(u,v). For reasons of algorithm stability (as explained below), the key function H(u,v) is selected as being a phase-only function of the form:

$$H(u,v)=\exp[i\phi(u,v)]$$

wherein $\phi(u,v)$ is a random function generated by a random-number computer generator, and is uniformly distributed within the interval $-\pi$ to $\pi$.

To enable encryption of the first pattern and decryption of the halftone picture thereof, the halftone picture to be created is such that, when correlated with a predetermined reference function h*(-x,-y), yields the hidden output pattern $\alpha(\xi,\eta)$. Generally, the reference function h*(-x,-y) is related to the key function by spatial transformation. In this specific example of the invention, utilizing a two-dimensional Fourier transform, the function h*(-x,-y) is the complex conjugate of the 180°-rotated function obtained as the inverse Fourier transform (IFT) of the key function. The visible pattern $f(x,y)$ is used as the constraint on the input function (halftone picture). This means that, instead of a meaningless pattern of binary dots in the input, the halftone picture presents the pattern $f(x,y)$.

Thus, the transformation used in the present invention to encode the halftone picture of the first pattern is in the form of a correlation between the complex function g(x,y) representative of the first visible pattern and the predetermined reference function h*(-x, -y), that is:

$$c(\xi,\eta)=g(x,y)\otimes h^*(-x,-y)$$

wherein $\otimes$ denotes a correlation.

Thus, the complex function representing the output hidden pattern, $c(\xi,\eta)$, which is the result of the correlation, is as follows:

$$c(\xi,\eta)=\{f(x,y)\exp[i\theta(x,y)]\otimes h^*(-x,-y)=IFT\{FT[g(x,y)\exp[i\phi(u,v)]]\} \quad (1)$$

Accordingly, the input function is given by:

$$g(x,y) = IFT\left\{\frac{FT[c\xi,\eta)]}{H(u,v)}\right\} = IFT\{FT[c(\xi,\eta)]\exp[-i\phi(u,v)]\} \quad (2)$$

Figure 4:
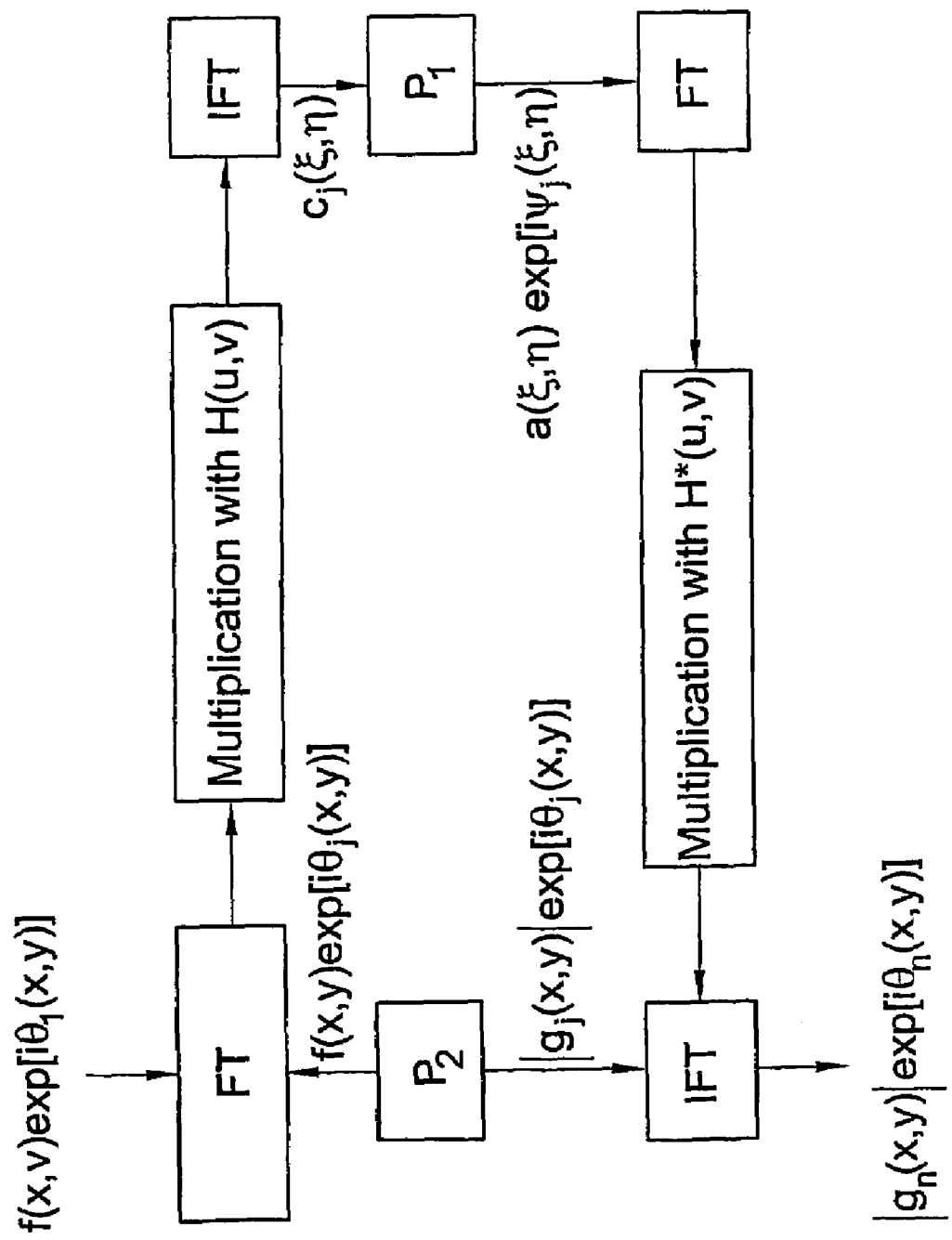
FIG. 4 is a flow chart more specifically illustrating the main steps in the method stage of FIG. 3A consisting of determining a matching condition between a first visible pattern and a second hidden pattern.

Having defined the transformation, the optimal argument function $\theta(x,y)$ of the phase function $\exp[i\theta(x,y)]$ (defining the matching condition) is to be determined. This is implemented by a sequence of iterations, as shown in FIG. 4.

The iterative algorithm, which is the projection-onto-constraint-sets (POCS) based algorithm, modified to operate with correlations [J. Rosen, "Learning in correlators based on projections onto constraint sets," Opt. Lett. 18, 1183-1185 (1993); Y. Li, K. Kreske, and J. Rosen "Security and Encryption optical systems based on a correlator with significant output images", Applied Optics, 39, pp. 5295-5301, 2000], starts with an initial random function $\exp[i\theta_1(x,y)]$. The correlation process described in equation (1) is carried out: FT applied to the function $g_1(x,y)=f(x,y)\exp[i\theta_1(x,y)]$, the FT result is multiplied with the key function H(u,v)=$\exp[i\phi(u,v)]$, and IFT is applied to the multiplication results.

The so-obtained function $c_1(\xi,\eta)=|c_1(\xi,\eta)|\exp[i\psi(\xi,\eta)]$ is processed by a projection operation denoted $P_1$. This procedure consists of the following:

The constraint on the output plane is defined by the requirement to obtain the hidden image $\alpha(\xi, \eta)$. Therefore, in the output plane, projection $P_1$ onto the constraint set at the jth iteration is as follows:

$$P_1[c_j(\xi,\eta)] = \begin{cases} a(\xi,\eta)\exp[i\psi_j(\xi,\eta)] & (\xi,\eta) \in W \\ c_j(\xi,\eta) & \text{otherwise} \end{cases} \quad (3)$$

wherein $\exp[i\psi_j(\xi,\eta)]$ is the phase function of the complex function $c_j(\xi,\eta)$ in the jth iteration; and W is a window support of the hidden image. The window's area is smaller than or equal to the area of the output plane.

The function $\alpha(\xi,\eta)\exp[i\psi_j(\xi,\eta)]$ resulting from the above projection $P_1$ now undergoes a processing similar to that initially applied to the function $g_1(x,y)$, to thereby transform backward the function $|g_j(x,y)|\exp[i\theta_j(x,y)]$. To this end, the correlation described in equation (2) above is carried out: application of FT, multiplication of the FT results with the complex conjugate of the key function $H^*(u,v)=\exp[-i\phi(u,v)]$, and IFT of the results.

The so-obtained function $|g_1(x,y)|\exp[i\theta_j(x,y)]$ then undergoes a similar projection $P_2$ onto the constraint set at the jth iteration in the input plane:

$$P_2[g_j(x,y)]=f(x,y)\exp[i\theta_j(x,y)] \quad (4)$$

wherein $\exp[i\theta_j(x,y)]$ is the phase function of $g_j(x,y)$ at the jth iteration.

This process results in the first image function $f(x,y)\exp[i\theta_j(x,y)]$, wherein $\exp[i\theta_j(x,y)]$ is an optimized phase function (variable characteristic of the transformation process).

Thus, at every iteration in each of the two domains, $(x,y)$ and $(\xi,\eta)$, the functions obtained are projected onto the constraint sets. In both domains, the constraint sets express the expectation of getting the predefined images $\alpha(\xi,\eta)$ at $(\xi,\eta)$ and $f(x,y)$ at $(x,y)$. The algorithm continues to iterate between the two domains until the error between the actual and the desired image functions is no longer meaningfully reduced.

As indicated above, the key function $H(u,v)$ is chosen only once before the iterations. This $H(u,v)$ becomes part of the correlator, and it is never changed during the iteration process.

The first operational stage (aimed at determining the optimal solution for the phase function) is terminated in the nth iteration, when the correlation between $g_n(x,y)$ and $h^*(-x,-y)$ yields a complex function whose magnitude is close enough to the hidden image $\alpha(\xi,\eta)$ by means of a relatively small mean-square error. It should be understood that small error values depend on the nature of the given images $\alpha(\xi,\eta)$, and $f(x,y)$.

The iteration process is terminated before the corresponding projection $P_2$, because in the next stage the function $g_n(x,y)$ is binarized, i.e., an operation that causes the output image to become only an approximation of the desired image (hidden image). If the iteration process is terminated after projection $P_2$, the error in image $\alpha(\xi,\eta)$ will be increased, because the magnitude of the correlation between $P_2[g_n(x,y)]$ and $h^*(-x,-y)$ is only an approximation of $\alpha(\xi,\eta)$ and the binarization adds more error.

The iteration process never diverges. The convergence of the iteration process to the desired images in the jth iteration is evaluated by two average mean-square errors between the two complex functions, before and after the projections in the two domains. Since the phase functions are not changed by the projections, the errors are the average mean square of the difference between magnitudes before and after the projections. The mean-square errors are as follows:

$$e_{cj} = \frac{1}{M_W^2} \int\int |P_1[c_j(\xi,\eta)] - c_j(\xi,\eta)|^2 d\xi d\eta \quad (5)$$

$$= \frac{1}{M_W^2} \int\int |a(\xi,\eta) - |c_j(\xi,\eta)||^2 d\xi d\eta,$$

$$e_{gj} = \frac{1}{M^2} \int\int |P_2[g_j(x,y)] - g_j(x,y)|^2 dx dy$$

$$= \frac{1}{M^2} \int\int |f(x,y) - |g_j(x,y)||^2 dx dy,$$

wherein the size of the input plane is M×M and the size of the window support W of the hidden image in the output plane is $M_W \times M_W$. When the reduction rate of these error functions falls below some predefined value, the iterations can be stopped.

As known from the above-indicated article "*Learning in correlators based on projections onto constraint sets*", to guarantee that these errors will never diverge, the correlator should be an energy-conserving operator, which is inherently achieved, if the key function $H(u,v)$ is a phase-only function. Additionally, the case should be such that, among all the functions that belong to the constraint sets, the two projected functions in the jth iteration, $P_1[c_j(\xi,\eta)]$ and $P_2[g_j(x,y)]$, are the functions closest (by means of the mean-square metric) to the functions $c_j(\xi,\eta)$ and $g_j(x,y)$, respectively. This condition is also satisfied in the invented method, since the phase distributions are the same before and after the projections in both domains. Therefore, the POCS iteration algorithm used in the preferred embodiment of the invention can never diverge, and at most the errors may stagnate at some values.

It should be noted that for the reason of providing the nondiverging feature of the iteration algorithm, phase-only functions are preferably used as spatial filters (key functions) in the spatial-frequency domain. When using an optical realization of the correlator at the decryption side, the phase-only filters are also preferred. These filters theoretically do not absorb energy and thus promote maximum system efficiency. The construction and operation of such an optical correlator will be described below with reference to FIG. 6.

Turning back to FIG. 3A, the second operational stage is aimed at converting the complex function $g_n(x,y)$ into a binary function $b(x,y)$. By displaying $b(x,y)$ on the input plane of the correlator, the hidden image should be obtained in the output of the correlator equipped with the same filter function $H(u,v)$. It should be understood that in the usual halftone binarization, only a single, positive, real gray-tone function is converted into a binary function. However, in the present case two positive real functions are to be encoded, phase $\theta_n(x,y)$ and magnitude $|g_n(x,y)|$, which is close enough to the visible image $f(x,y)$ if the error $e_{g,n}$ is indeed small.

Following computer-generated hologram (CGH) techniques [A. W. Lohmann and D. P. Paris, "Binary Fraunhofer holograms generated by computer," Appl. Opt. 6, 1739-1748 (1967)], in the present invention, the magnitude $|g_n(x,y)|$ is encoded in the conventional manner with DAM, and the phase $\theta_n(x,y)$ is encoded with DPM. Every cell of the complex gray-tone function $g_n(x,y)$, the so-called pixel of a certain gray level, is replaced by a binary matrix of dots (subpixels) of a size d×d. Inside each matrix there is a predetermined shape of an area occupied by dot. The dot is represented by binary value "1". The area occupied by the dots in the cell corresponds to the respective gray level of the first visible pattern, and the relative position of this area within the cell corresponds to the magnitude of the second hidden pattern. To this end, in the (k,l)th cell, the area occupied by the corresponding number of dots (e.g., one dot) is determined by the value of $|g_n(x_k,y_l)|$, and the position of this area is determined by the phase value of $\theta_n(x_k,y_l)$.

Figure 5A:
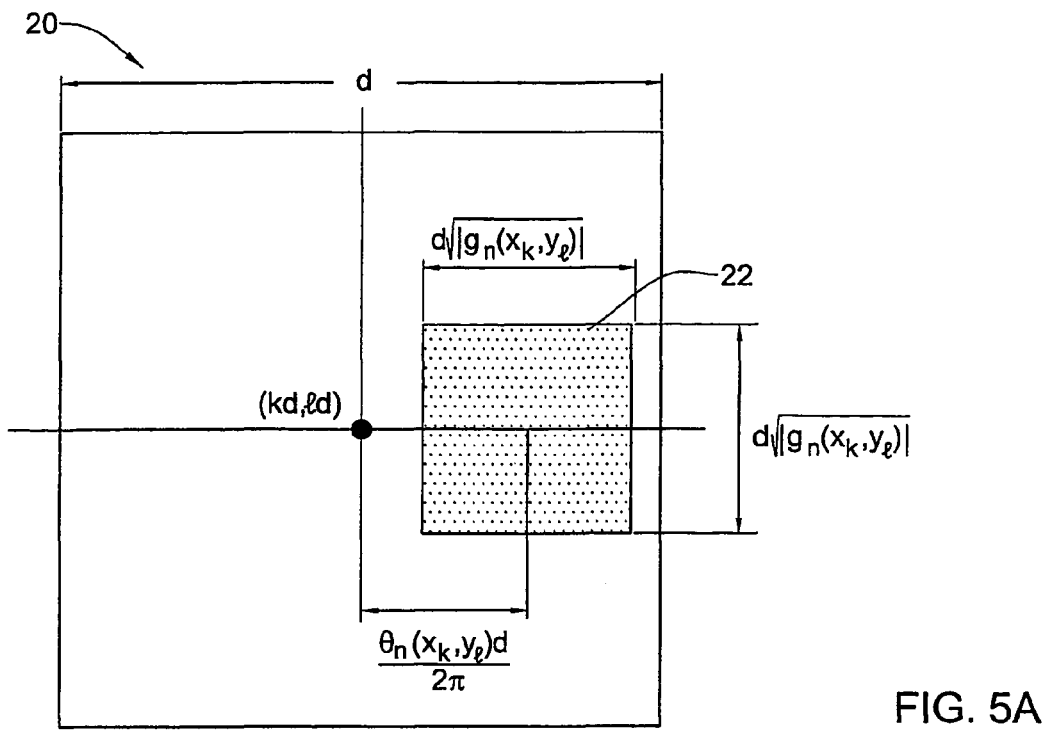
FIG. 5A illustrate the principles of the method stage of FIG. 3A consisting of creation of a binary halftone representation (picture) of the first visible pattern with the second pattern hidden therein based on dot-position modulation.

FIG. 5A schematically illustrates such a cell 20 with the dots' area 22 in the final halftone binary picture b(x,y), in which an approximation of the visible image $f(x,y)$, i.e., $|g_n(x,y)|$, is encoded by the area of the dots, $\theta_n(x,y)$ is embedded into the halftone pattern by the position of the dots, and the hidden image $\alpha(\xi,\eta)$ is exposable at the output plane of the correlator. In the present example of FIG. 5A, without loss of generality, the shape of the dots' area 22 is chosen as a square, and each dot is translated only along the horizontal axis.

Therefore, for the binary halftone picture b(x,y), we have:

$$b(x, y) = \sum_{k=-M/2}^{(M/2)_B} \sum_{i=-M/2}^{(M/2)_B} rect\left\{\frac{x - d[k + \theta_n(x_k, y_l)/2\pi]}{d[|g_n(x_k, y_l)|]^{1/2}}\right\} rect\left\{\frac{y - ld}{d[|g_n(x_k, y_l)|]^{1/2}}\right\}, \quad (6)$$

Here, the values of $\theta_n(x,y)$ are defined in the interval $[-\pi,\pi]$, and $0 \le |g_n(x,y)| \le 1$. The function rect(x/a) is defined as "1" for $|x| \le \alpha/2$ and as "0" otherwise. The superscript B indicates that the summation is Boolean, such that if two adjacent rect functions overlap, their sum is equal to "1".

It should be understood that translation of dots along the horizontal axis only is associated with hiding one image within the halftone representation of another, visible image. To hide two different images within the same halftone representation of the visible image, translation of dots along two mutually perpendicular axes is carried out.

Figure 5B:
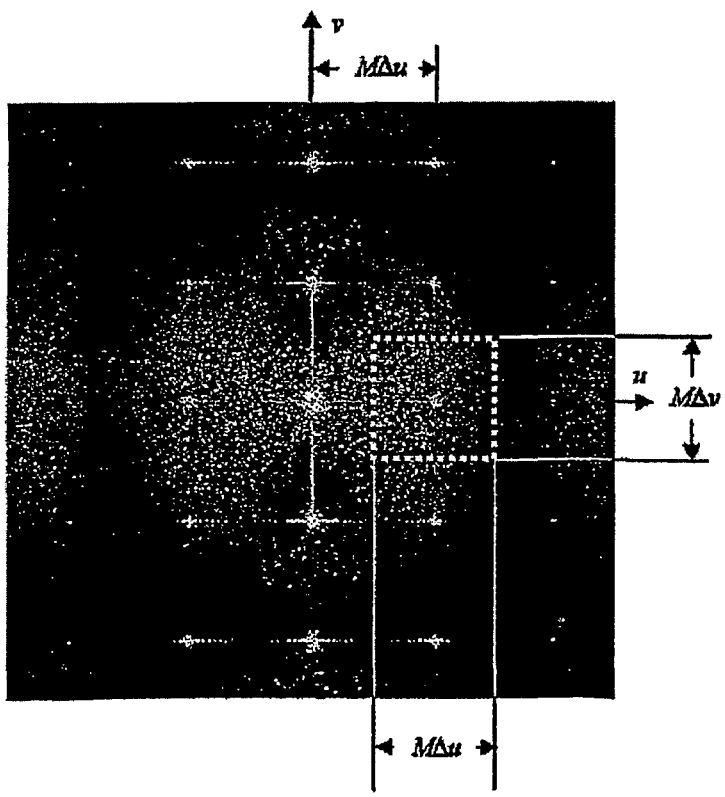
FIG. 5B illustrates the spatial spectrum of a typical binary halftone picture.

The halftone binary picture b(x,y) is a 2-D grating, and its Fourier transform is an array of 2-D Fourier orders on the spatial frequency plane separated by M pixels from one another. FIG. 5B exemplifies a typical spatial spectrum of the grating b(x,y).

Following the analysis of the detour-phase CGH, it can be shown that an approximation of the complex function $G_n(u, v)$, i.e., the FT of $g_n(x,y)$, is obtained in the vicinity of the first Fourier-order component. Thus, the approximation is expressed as follows:

$$B(u, v) \approx G_n(u, v) \quad |u - M\Delta u| \le M\Delta u/2, \quad (7)$$

$$|v| \le M\Delta/2$$

Here, $\Delta u \times \Delta v$ is the size of the pixel (the smallest element in the spatial frequency plane) and B(u,v) is the FT of the halftone binary function b(x,y).

The fact that the distribution about the first order is only an approximation of $G_n(u,v)$ may introduce some error in the reconstructed image. This error is inversely dependent on the number of quantization levels used in the halftone picture. The number of quantization levels is naturally determined by the cell size d. Because the interesting distribution occupies only part of the spatial-frequency plane about the first-order component this area of M'M pixels can be isolated about a point (M,0). The isolated area is multiplied by the filter function H(u,v) and inversely Fourier transformed onto the output plane.

The approximate output distribution is as follows:

$$c(\xi,\eta) \approx IFT[G_n(u,v)H(u,v)] \quad (8)$$

Consequently, the magnitude of output function $|c(\xi,\eta)|$ is approximately equal to the hidden image $\alpha(\xi,\eta)$.

Figure 6:
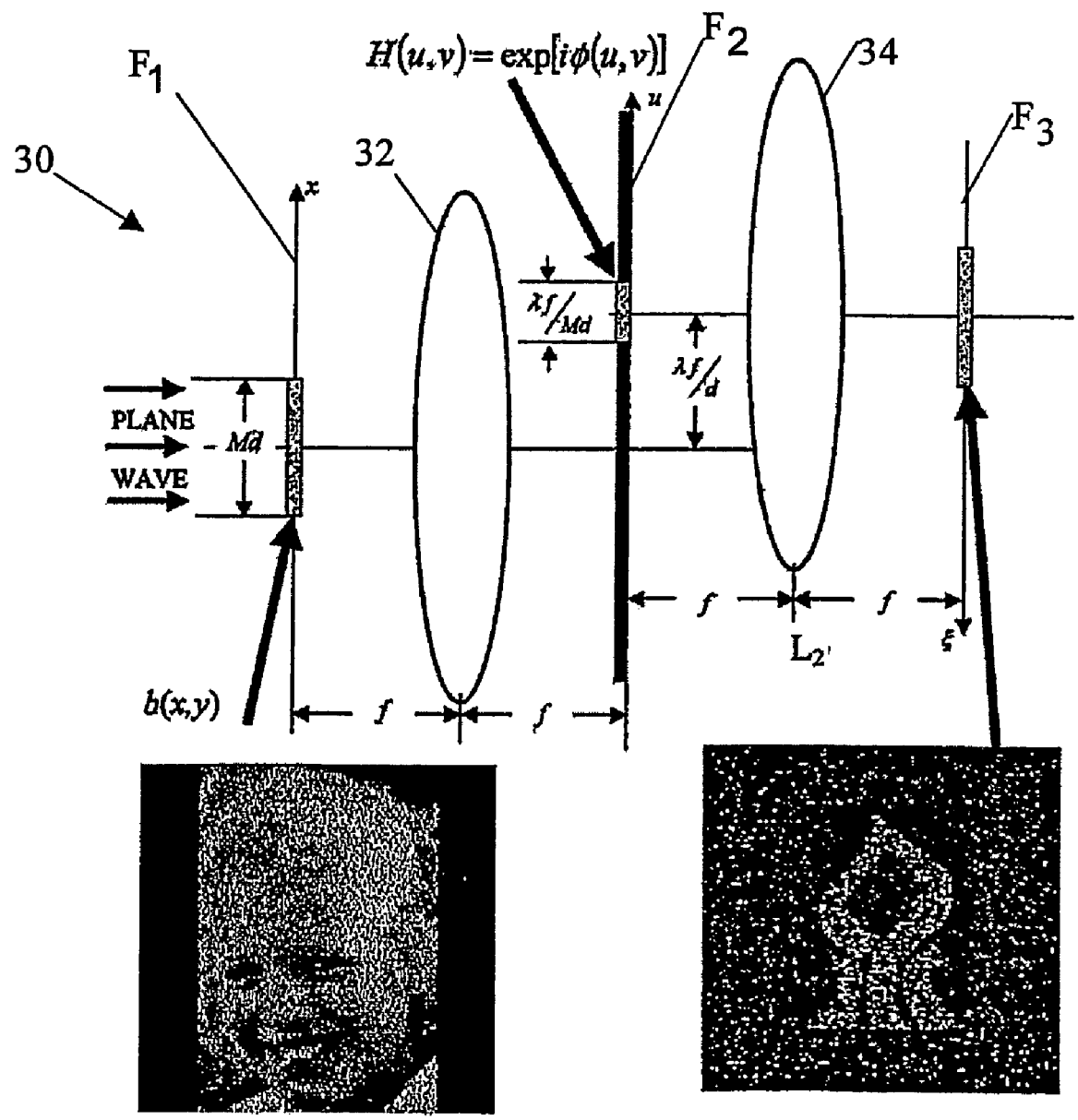
FIG. 6 illustrates an optical assembly suitable for processing the halftone picture to decrypt it thereby enabling identification of the hidden pattern.

Reference is now made to FIG. 6 illustrating an optical assembly 30 presenting the optical version of this correlator. The optical assembly comprises two lenses 32 and 34 of equal focal length $f$. The lenses 32 and 34 are arranged in a spaced-apart parallel relationship, such that they are spaced a distance $2f$ along their optical axes, and the optical axes are spaced along the perpendicular axis a distance $\lambda f/d$. The halftone picture b(x,y) is displayed on a focal plane $F_1$ of the lens 32 and is illuminated by a plane wave. As a result, multiple diffraction orders are obtained on a back focal plane $F_2$, each at the distance $\lambda f/d$ from its neighbors. The area of the first diffraction order of the size $(\lambda f/Md) \times (\lambda f/Md)$ is multiplied by the phase only filter mask H(u,v), which is located in the focal plane $F_2$, whereas the entire spectral area is blocked. The lens 34 performs a Fourier transform onto its focal plane $F_3$, where the hidden image is assumed to come into sight. In this scheme, it is assumed that the input halftone picture b(x,y) is a transmission mask that modulates the plane wave. It should be understood although not specifically shown, that when the halftone picture is printed on a regular opaque paper, it has to be recorded first by a digital camera. Then the recorded binary image can be displayed on a spatial light modulator and processed by the optical assembly 30. Hence, for the purposes of the present invention, an optical scanner of the conventional type either equipped with the optical assembly 30 or connectable to a digital correlator, can be used to identify the hidden image.

Turning back to the experimental results of FIGS. 2A-2E, these results were obtained by applying the halftone coding method with a digital correlator, the size of each one of the three planes in the POCS algorithm being 128×128 pixels. The experiments with all five pairs were performed with the same phase filter H(u,v), for which the phase distribution was generated by the random-number generator of the computer, and the same function h*(−x, −y) was used in the correlation. The POCS algorithm was iterated on average as many as 50 times. Additional iterations did not meaningfilly reduce the two errors $e_{c,j}$ and $e_{g,j}$. After completing the POCS algorithm, the resultant complex functions $g_n(x,y)$ was binarized according to the above equation (6). The size of each cell in these experiments is 19×19 pixels, and consequently the gray-tone image is quantized with 10 levels of magnitude (considering the square dots' area) and 19 levels of phase.

Figure 7A:
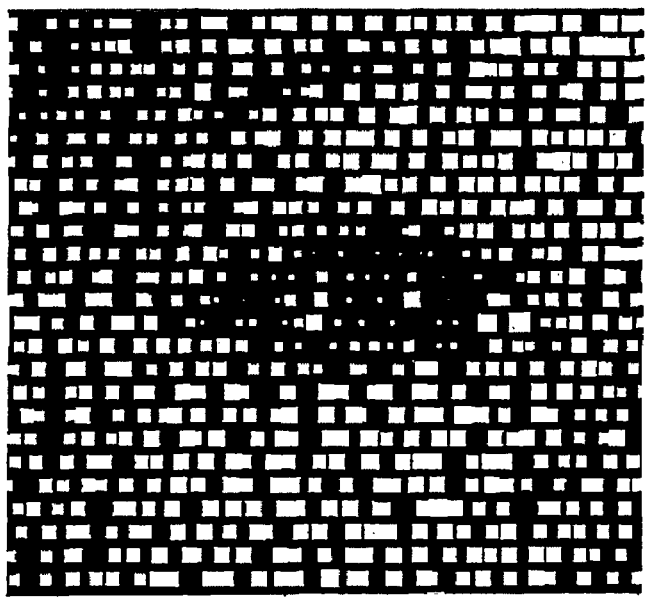
FIGS. 7A and 7B exemplify an enlarged region of the halftone picture with and without dot-position modulation, respectively.
Figure 7B:
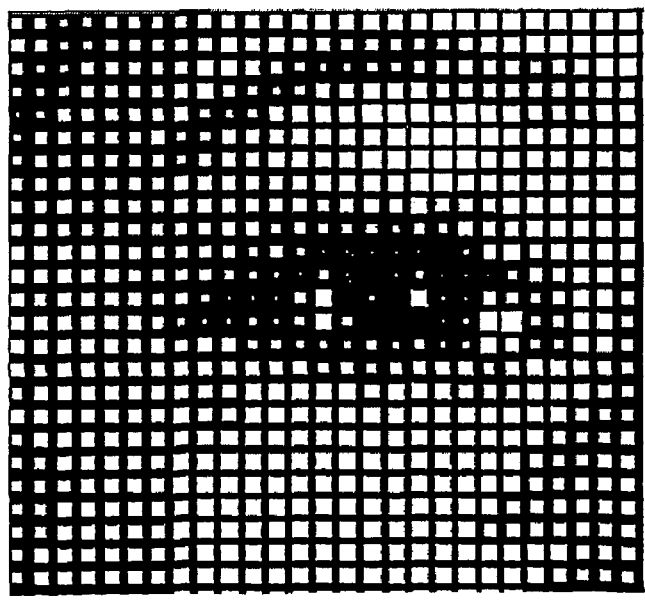
Figures 8A, 8B, 8C, 8D, 8E:
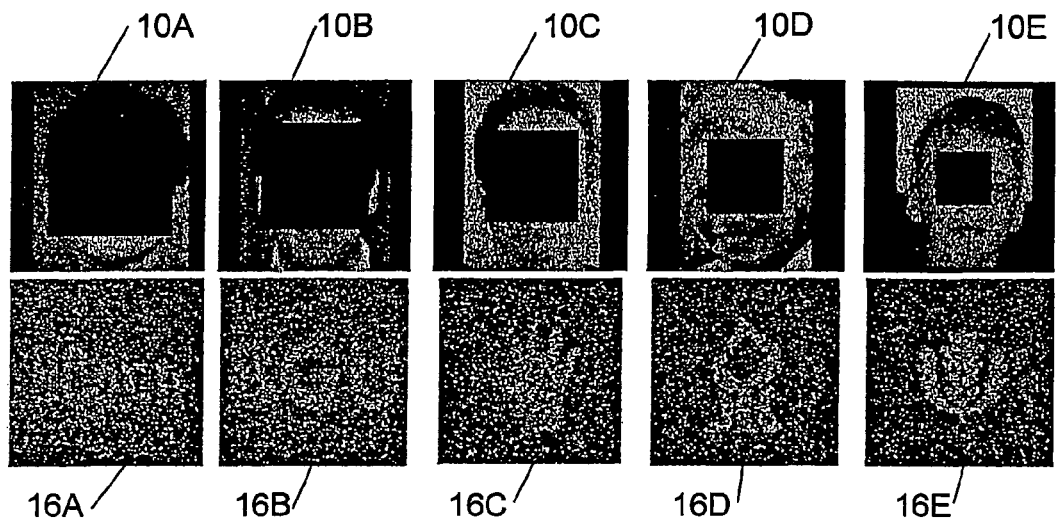
FIGS. 8A-8E and 9A-9E show experimental results illustrating advantageous features of the present invention.
Figures 9A, 9B, 9C, 9D, 9E:
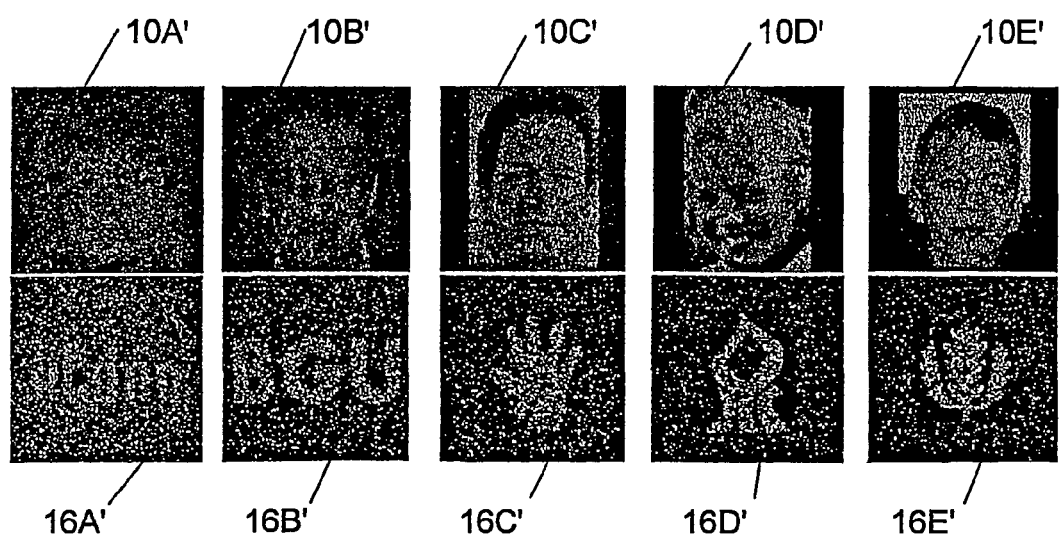

FIG. 7A shows an enlarged region of one of the halftone pictures 10. For comparison, the same region but without modulation of the dot position is shown in FIG. 7B.

The robustness of the method was also examined, and the results are illustrated in FIGS. 8A-8E and 9A-9E. This robustness is achieved because each pixel in the output is obtained as a weighted sum of many input pixels. The exact number of pixels that participate in this summation is equal to the size of the function h(x,y). In the present example, the function h(x, y) has not been narrowed.

In the examples of distortions shown in FIGS. 8A-8E, the halftone pictures 10A-10E obtained in the experiments of FIGS. 2A-2E were covered in the vicinity of their centers with zero-valued squares of an area that varied from 11% of the original picture area (picture 10E) to 55% at the leftmost figure to 55% (picture 10A). Patterns 16A-16E are extracted hidden images revealed from these covered halftone pictures, i.e., correlation results between the pictures 10A-10E, respectively, and the reference function. As shown, the hidden image can still be recognized, even when 55% of the area of the halftone picture is missing.

In the examples of distortions shown in FIGS. 9A-9E, various amounts of pixel values in the halftone pictures 10A'-10E' were randomly flipped from their original values shown in FIGS. 2A-2E. The number of flipped pixels is varied from 8% (picture 10E') to 40% (picture 10A'). Patterns 16A'-16E' are extracted hidden images obtained as the results of the correlation between pictures 10A'-10E' and the reference function. As shown, the same robust behavior was maintained for this type of noise.

Figure 10:
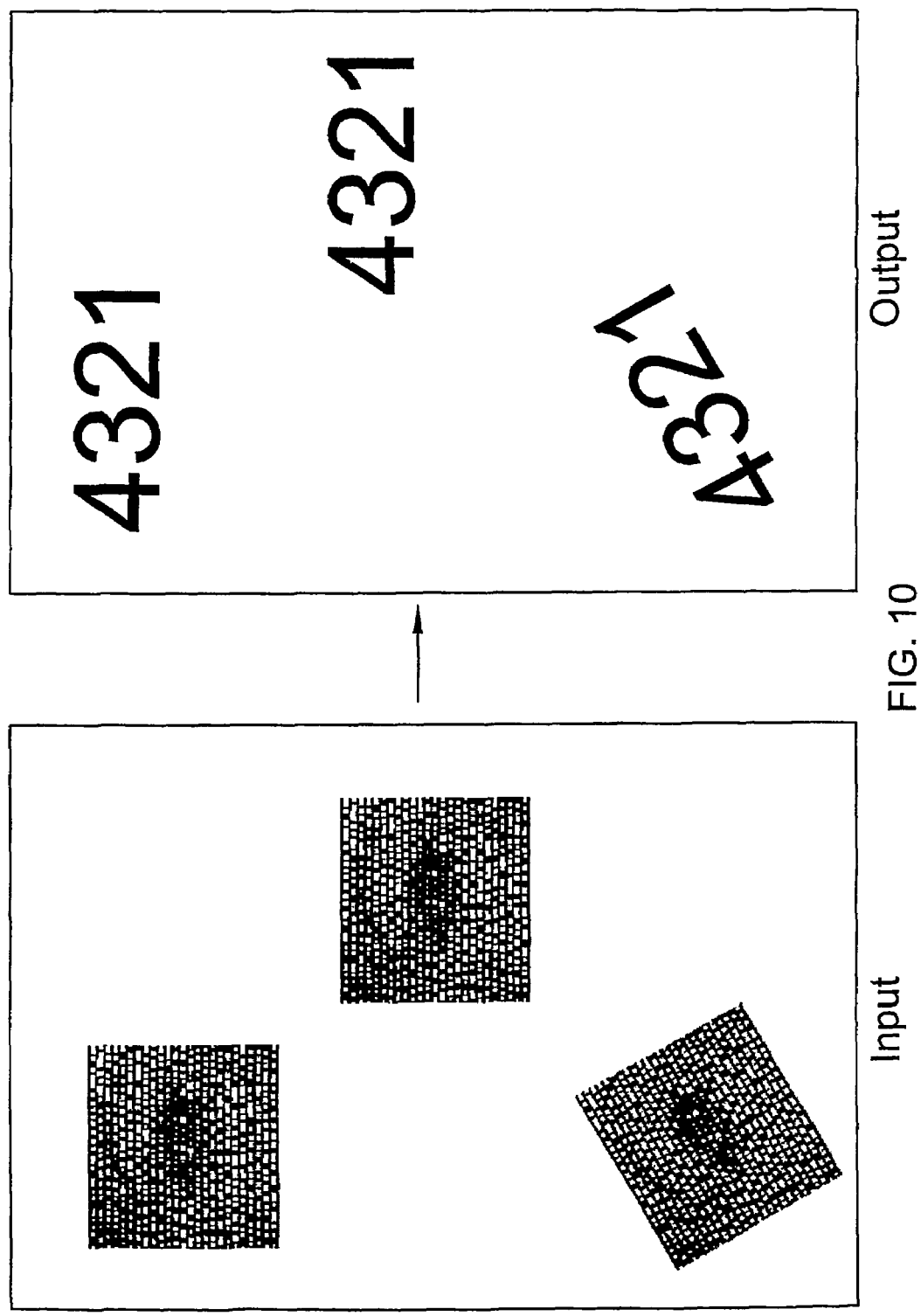
FIG. 10 presents another experimental results illustrating some more advantageous features of the present invention.

FIG. 10 illustrates the geometrical distortion invariance of the correlator. As shown, rotation of the input halftone picture $HP_{in}$ results in the corresponding rotation of the extracted hidden image in the output $HI_{out}$, and does not affect the quality of the extracted hidden image.

Thus, the present invention provides for concealing an arbitrary image in a different arbitrary halftone picture. A digital or optical correlator with a unique key filter can recover the hidden image. Every part of the hidden image is concealed globally in all the points of the halftone picture. This feature increases the robustness of the process to noise and distortions. Using the correlator has the following advantages:

The image reconstruction from the halftone picture is relatively robust to noise. This is so because, for some requirements on the size of the key reference function, the hidden image is memorized globally in all the halftone dots. This means that every pixel in the output image is obtained as a weighted sum of the entire input picture's dots. Therefore, even if several pixels from the input halftone figure are distorted from their correct values, the output result can still be recognized because of the contributions from the other, non-distorted pixels. The spatial correlator has the property of the shift invariance, which means that, no matter where the halftone image appears at the input plane, the hidden output image is produced on the output plane.

Additionally, the same deciphering system can be implemented as an optical, electrical, or hybrid system. This is due to the fact that the optical VanderLugt correlator, the hybrid joint-transform correlator, or a digital computer can be used as the spatial 2-D correlator.

When digital correlations are used, it is obvious to use the fast-FT algorithm as a tool for computing the correlations, both in the coding process and in reading the hidden images. Therefore, the computation time is relatively short as compared to those of other, more general, linear space-variant processors.

Figure 11:
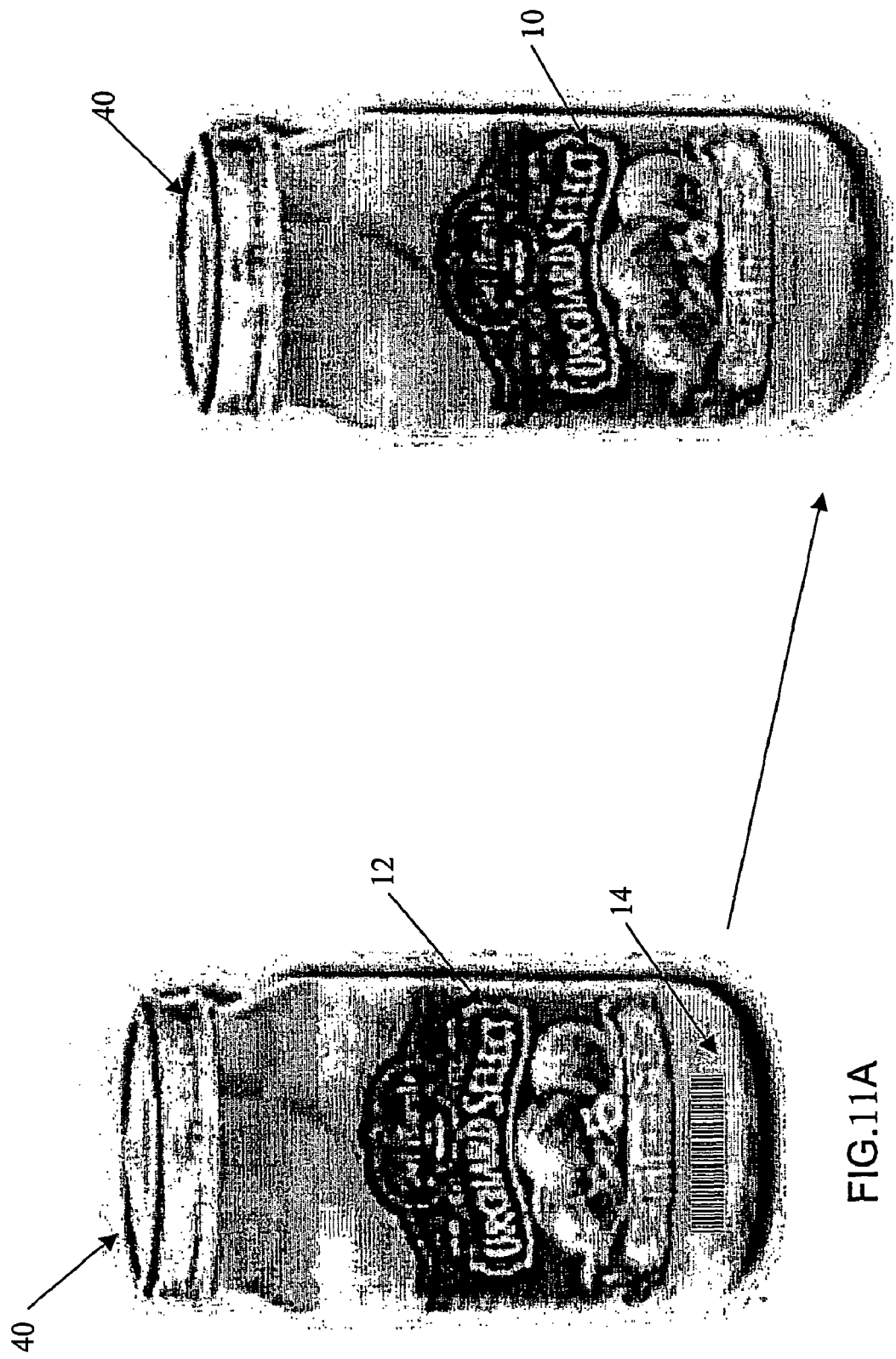
FIGS. 11A and 11B exemplify a particular application of the technique of the present invention where a bar code is hidden within an item advertisement image (visible pattern)
Figure 12:
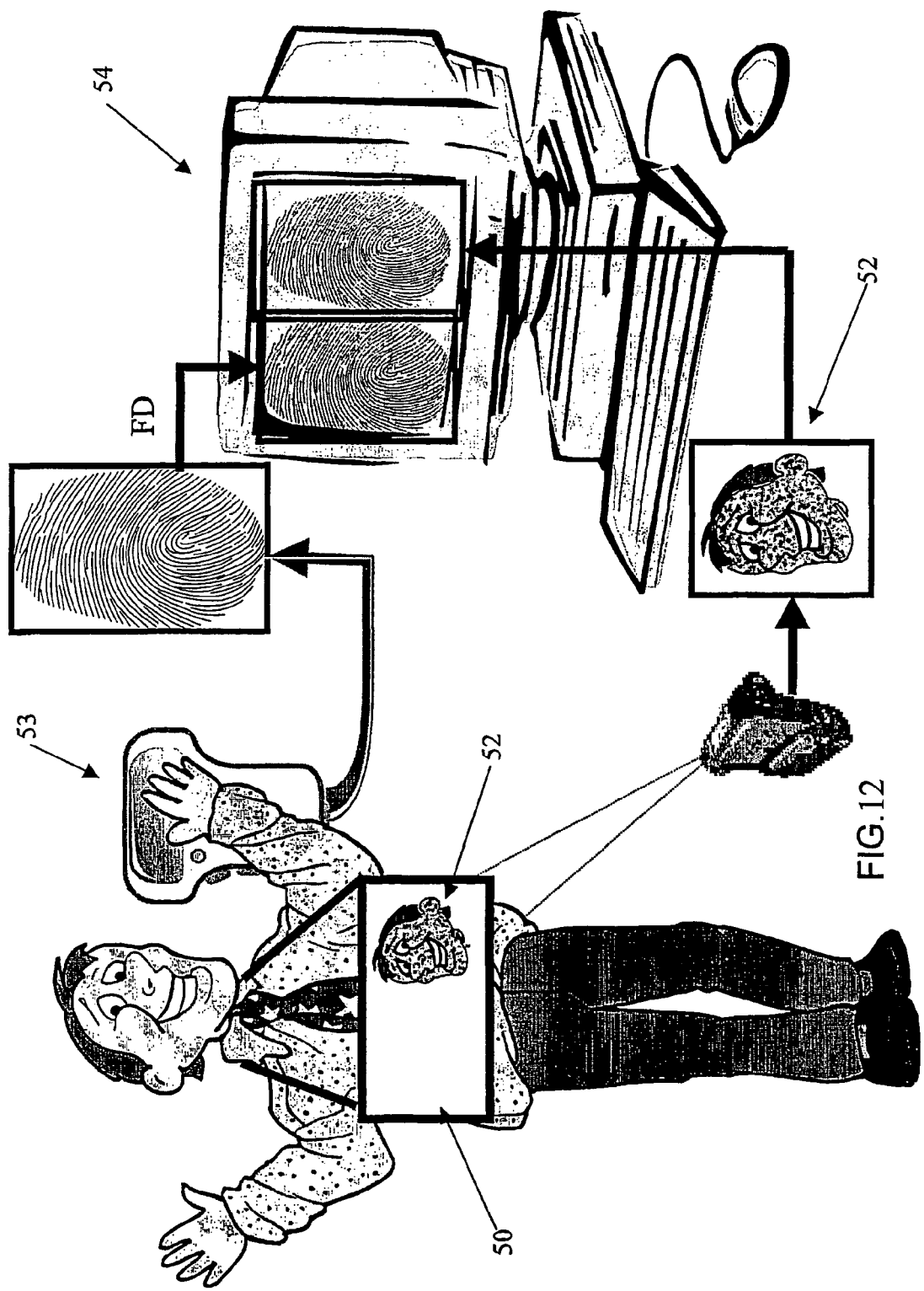
FIG. 12 illustrates how the present invention can be used for authentication purposes.

Reference is now made to FIGS. 11A-11B illustrating how the present invention can be used for items identification. FIG. 1A shows an item 40 that carries an advertisement information piece 12 (constituting a first visible pattern) and a bar code 14 (constituting a second pattern), which is typically presented in items to be purchased. FIG. 11B shows the same item 40, but with the halftone picture 10 of the visible pattern 12 with the bar code pattern 14 hidden therein. This technique enables optimal using of the space on the item's surface. Such a halftone picture may be printed directly onto the item's surface or incorporated in a label attachable to the item FIG. 12 illustrates how the present invention can be used for authentication purposes. A person's identification card 50 includes a halftone picture 52, in which some personal information a photo in the present example, is visible and information indicative of the person's fingerprint is hidden. Data FD representative of the cardholder's fingerprint is collected via any known suitable system, generally designated 53, and supplied to a processor 54 (typically computer system). Data representative of the halftone picture 52 is also supplied to the processor 54. The processor 54 is preprogrammed with the digital correlator of the present invention (constituting a decoding device) that processes the data indicative of the halftone picture to extract, data representative of the hidden image. Another suitable utility of the computer device 54 compares this data to the cardholder's fingerprint FD thereby enabling authentication of the cardholder: if the data representative of the hidden image and data representative of the fingerprint of the cardholder do not match each other, the processor 54 will generate a warning signal. This is a few minutes procedure that provides for high-accuracy identification/authentication. It should be understood, that although in the present example the correlator (digital or optical) is shown as the constructional part of the same computer system performing the authentication, such correlator may be incorporated in a separate unit connectable to the processor 54 to supply thereto data representative of the extracted hidden pattern.

Those skilled in the art will readily appreciate that various modifications and changes can be applied to the embodiments of the invention as hereinbefore exemplified without departing from its scope defined in and by the appended claims.

The invention claimed is:

1. A method as implemented on an encoding device for hiding within a visible representation of a first pattern, at least one second pattern, the method comprising the steps of:
   (i) selecting a predetermined key function;
   (ii) utilizing said key function to create a binary halftone representation of the first pattern, in which the first pattern is visible and the at least one second pattern is hidden, each cell in said binary halftone representation having halftone dots' position distribution corresponding to gray-level distribution of the at least one second pattern, thereby enabling processing of said binary halftone representation by a two-dimensional spatial correlator based on the key function to extract data representative of the at least one second hidden pattern.

2. The method according to claim 1, wherein said binary halftone representation is such that, when correlated with a reference function, that relates to said predetermined key function by a spatial transformation, results in said at least one second pattern.

3. The method according to claim 2, wherein the creation of said binary halftone representation of the first pattern comprises the steps of:
   defining a matching condition between first and second complex functions describing the first and second patterns, respectively, said matching condition presenting a transformation between the first and second functions;
   determining a corresponding solution for a variable characteristic of the first complex function, such that said variable characteristic based on said solution, when multiplied by the first pattern and passed through the two-dimensional spatial correlator, results in the complex function with a magnitude equal to the second hidden pattern; and
   binarizing the first complex function based on said solution to thereby create said binary halftone representation.

4. The method according to claim 3, wherein the determination of said solution comprises a sequence of iterations of the transformation.

5. The method according to claim 4, wherein the iteration process utilizes a projection-onto-constraint-sets (POCS) algorithm.

6. The method according to claim 3, wherein the binarizing of the first pattern comprises shifting the halftone dots within each cell along at least one axis in accordance with said solution for the variable characteristic, thereby hiding said at least one second pattern within the halftone representation.

7. The method according to claim 3, wherein the binarizing of the first pattern comprises shifting the halftone dots within each cell along two mutually perpendicular axes in accordance with said solution for the variable characteristic, thereby hiding two different patterns within the halftone representation.

8. The method according to claim 2, wherein the transformation is based on a 2-D Fourier transform, said predetermined reference function relating to the key function by the 2-D Fourier transform.

9. The method according to claim 8, wherein said predetermined reference function is the complex conjugate of a 180°-rotated function obtained as the inverse Fourier transform of the key function.

10. The method according to claim 8, wherein said matching condition is defined as follows:

$$\alpha(\xi,\eta)\exp[i_\psi(\xi,\eta)]=IFT\{FT(f(x,y)\exp[i_\theta(x,y)])\exp[i_\phi(u,v)]\}$$

wherein $\alpha(\xi,\eta)\exp[i_\psi(\xi,\eta)]$ is the second complex function of the second pattern $\alpha(\xi,\eta)$, $f(x,y)\exp[i_\theta(x,y)]$ is the first complex function of the first pattern $f(x,y)$; and $\exp[i_\phi(u,v)]$ is the phase only key function, $\phi(x,y)$ being the solution of the variable characteristic $\exp[i_\theta(x,y)]$ of the first pattern.

11. The method according to claim 10, wherein said 2-D correlator is:

$$\alpha(\xi,\eta)\exp[i_\psi(\xi,\eta)]=f(x,y)\exp[i\theta(x,y)]\otimes h^*(-x,-y)$$

wherein the function $h^*(-x,-y)$ is said predetermined reference function related to the key function by a 2-D Fourier transform.

12. The method according to claim 1, wherein said key function is a phase only function.

13. The method according to claim 1, wherein the extraction of said hidden pattern from the binary halftone representation of the first pattern comprises applying a data-reading utility to said halftone representation to generate data indicative of said halftone representation, and processing said data indicative of the halftone representation with the 2-D correlator.

14. The method according to claim 13, wherein said data-reading utility is an optical scanner.

15. The method according to claim 13, wherein said 2-D correlator for processing the halftone representation is an optical assembly.

16. An decoding device for use in extracting a hidden pattern contained in a binary halftone representation of another visible-pattern, wherein said halftone representation is created by the method of claim 1, the decoding device comprising:
a two-dimensional spatial correlator for processing input data representative of the binary halftone representation with a spatial filter in the form of said key function, such that the hidden image is obtained in an output plane of the correlator as a correlation function between the binary halftone representation displayed in an input plane of said correlator and a predetermined reference function related to said key function by a spatial transformation.

17. The device according to claim 16, wherein said 2-D correlator is an optical assembly.

18. The-device according to claim 17, wherein said optical assembly comprises two lens of the same focal length f which are spaced from each other by a distance 2f, and a phase only filter mask presenting said key function located at a central plane between the lenses.

19. The device according to claim 16, and also comprising a data-reading utility applicable to said halftone representation to produce said data indicative thereof.

20. The device according to claim 19, wherein said data-reading utility comprises a spatial light modulator.

21. An item identification system for identifying a hidden pattern contained in a binary halftone representation of a first visible pattern, the system comprising the decoding device of claim 16.

22. An encoding device comprising an interface utility for entering input data, and a data processing and analyzing utility, which is responsive to the input data including first and second complex functions representative of first and second patterns, respectively, and a key function, to create a binary halftone representative of the first pattern, in which the first pattern is visible and the second pattern is hidden, and in which each cell has halftone dots' position distribution corresponding to gray-level distribution of the second pattern.

* * * * *